June 9, 1936.  H. A. HUSTED  2,043,584
METHOD AND APPARATUS FOR THERMOPLASTIC MOLDING
Filed Feb. 1, 1936  6 Sheets-Sheet 1

INVENTOR.
HARRY A. HUSTED,
BY
ATTORNEY.

INVENTOR,
HARRY A. HUSTED,
BY
ATTORNEY.

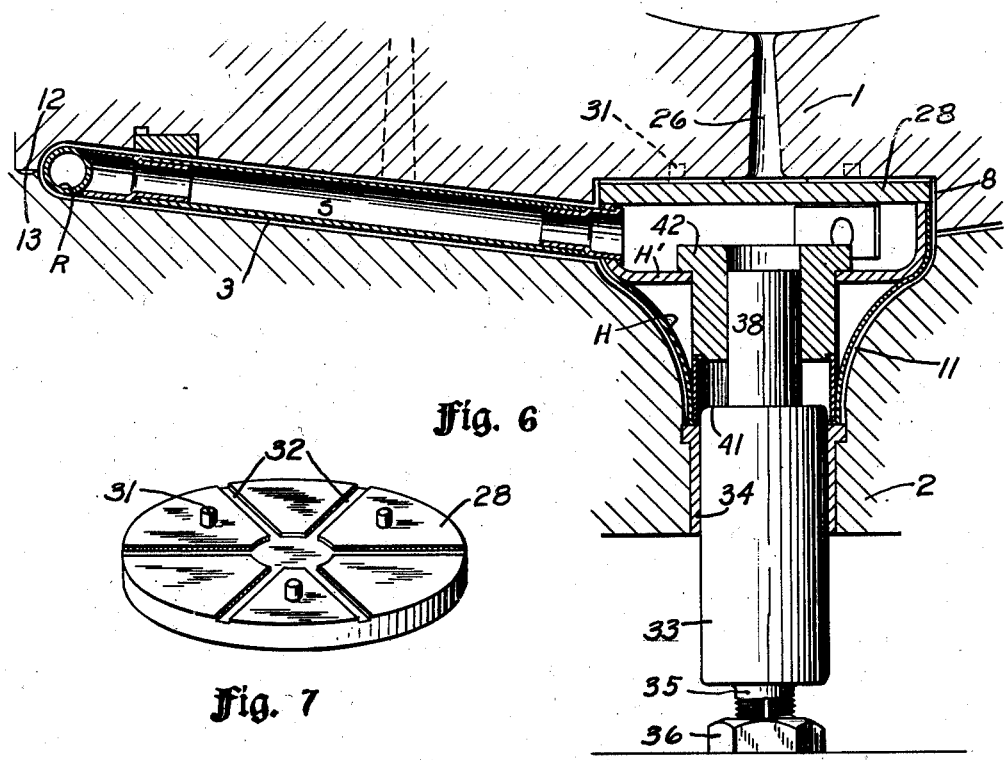
Fig. 6
Fig. 7
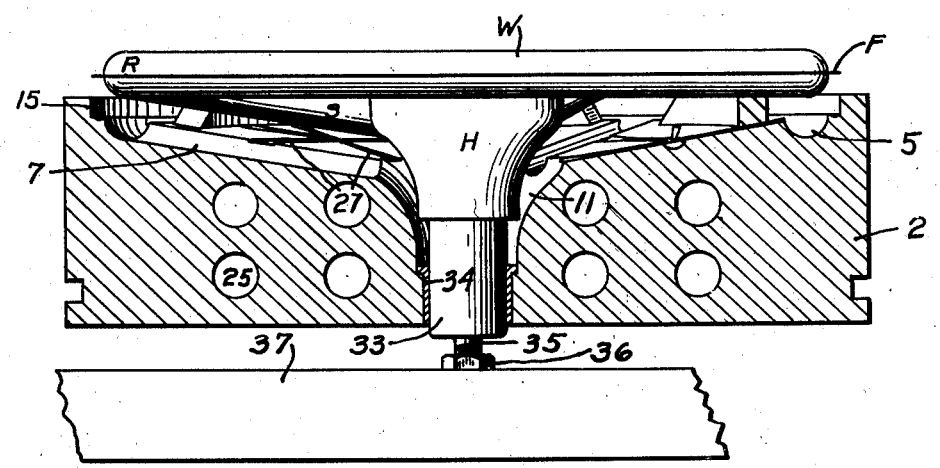
Fig. 8

June 9, 1936. H. A. HUSTED 2,043,584
METHOD AND APPARATUS FOR THERMOPLASTIC MOLDING
Filed Feb. 1, 1936 6 Sheets-Sheet 5

INVENTOR.
HARRY A. HUSTED,
BY
ATTORNEY.

Patented June 9, 1936

2,043,584

UNITED STATES PATENT OFFICE 2,043,584

METHOD AND APPARATUS FOR THERMOPLASTIC MOLDING

Harry A. Husted, Akron, Ohio, assignor to Justin W. Macklin, Cleveland, Ohio, trustee Application February 1, 1936, Serial No. 61,971

10 Claims. (Cl. 18—30)

This invention relates to an improvement in injection or extrusion type molds, which is a continuation in part of my copending application Serial No. 736,484, filed July 23, 1934; and is more specifically directed to such molds employed for applying thermoplastic material such as cellulose acetate to the surface of a preformed article like an automobile steering wheel.

Such thermoplastics particularly cellulose acetate are relatively very costly as compared to rubber, resinous compounds and numerous other thermoplastic materials. Further, such material has no great degree of adhesive property which may be relied upon to hold it on the surface of any base or frame.

Therefore further objects of the invention include methods of applying the cellulose acetate to frame members, inserts, and the like in an enveloping fashion with the material thinly, preferably evenly, distributed and under such pressures as will assure dense uniting of the particles of the material to a complete welding into a unitary enveloping structure, embracing the insert or frame.

Another object of the present invention lies in the provision of a mold having a relatively large unitary cavity into which thermoplastic material is introduced under heavy pressures from a plurality of gates and which may lead from a plurality of charge injecting sources.

Attempts have been made, prior to this invention, to form relatively large articles by injection type molds and by using such materials as synthetic resinous substances, but with inconsistent and unsatisfactory results. By means of the present mold and cellulose acetate material, which is far superior in durability, flexibility and appearance to synthetic resinous substances, a large market for cellulose acetate covered articles such as steering wheels and hardware has been created.

Applicant, by the use of the present type mold has consistently succeeded in covering a steering wheel, constructed of hollow tubular members, with a very thin uniform layer of cellulose acetate, whereas previous efforts over periods of several years had been unsuccessful.

Still another object of the present invention is to provide a positive injection type mold for covering a relatively large preformed article with a thermoplastic material.

By providing a combined injection and positive type mold, applicant can greatly decrease the time cycle for molding and substantially or entirely eliminate the loss of the material by the usual flashing at the parting line of the mold.

Another object is to provide a mold for applying plastic to a steering wheel, for example, having a framework constructed largely of tubular members and preferably with a hollow hub. The outline of the framework approximates that of the completed wheel whereby only a relatively thin layer of plastic material need be applied over the framework to produce a completed wheel which is attractive in appearance.

A further object of the present invention is to carry out an improved method of covering any metallic framework with plastic composition, by steps comprising the preparation of a rigid frame, securing the frame in a mold cavity with the frame uniformly spaced from the surface of the mold cavity and forcing thermoplastic material into the mold cavity under extremely high pressure so that it flows around the frame and fills the space intermediate the frame and the mold cavity.

Another object is to provide a mold for applying thermoplastic material to a preformed article, the mold being constructed so as to effect a quick and uniform heat transfer and the consequent decrease in the time cycle of the molding operation.

Another object of the invention is to provide a mold for thermoplastic material having a plurality of charge receiving chambers certain of which are used to preheat the material before entering the injecting chambers.

Since the raw material requires a certain amount of time to absorb enough heat from the walls of the chambers to become plastic, I may provide auxiliary chambers to preheat the material before it enters final heating and injecting cylinders.

A further object is to provide a mold having cavity walls which may remain at a substantially constant temperature throughout the molding cycle.

Still another object lies in the provision of a mold having a portion thereof adapted to heat and inject the material and another portion provided with the cavities which is separable from and interchangeable with other cavity members adapted to cooperate with the heating and injecting parts.

Further, I provide a mold having overflow pockets adjacent the mold cavity to insure complete filling of the cavity and still maintain the high pressure necessary to assure unity of the material at the division line of the mold.

Still another object is to provide a mold for covering a preformed article with plastic material, which will maintain the article to be covered in a central or proper location with respect to the cavity while the material is being injected therein.

The arrangement of applicant's gates with respect to the mold cavity produces an absolute pressure balance on the article within the cavity so that the application of a uniform coating of plastic material on the frame or insert is insured.

The above and other objects may become apparent from a consideration of the following specification, taken in conjunction with the accompanying drawings illustrating exemplary embodiments of my invention.

In the drawings,—

Fig. 6 is an enlarged fragmentary sectional view showing the ejector.

Fig. 7 is a perspective view of a cap disc for closing the upper portion of the hub.

Fig. 8 is a sectional view showing the wheel being ejected from the lower mold block.

Figure 1:
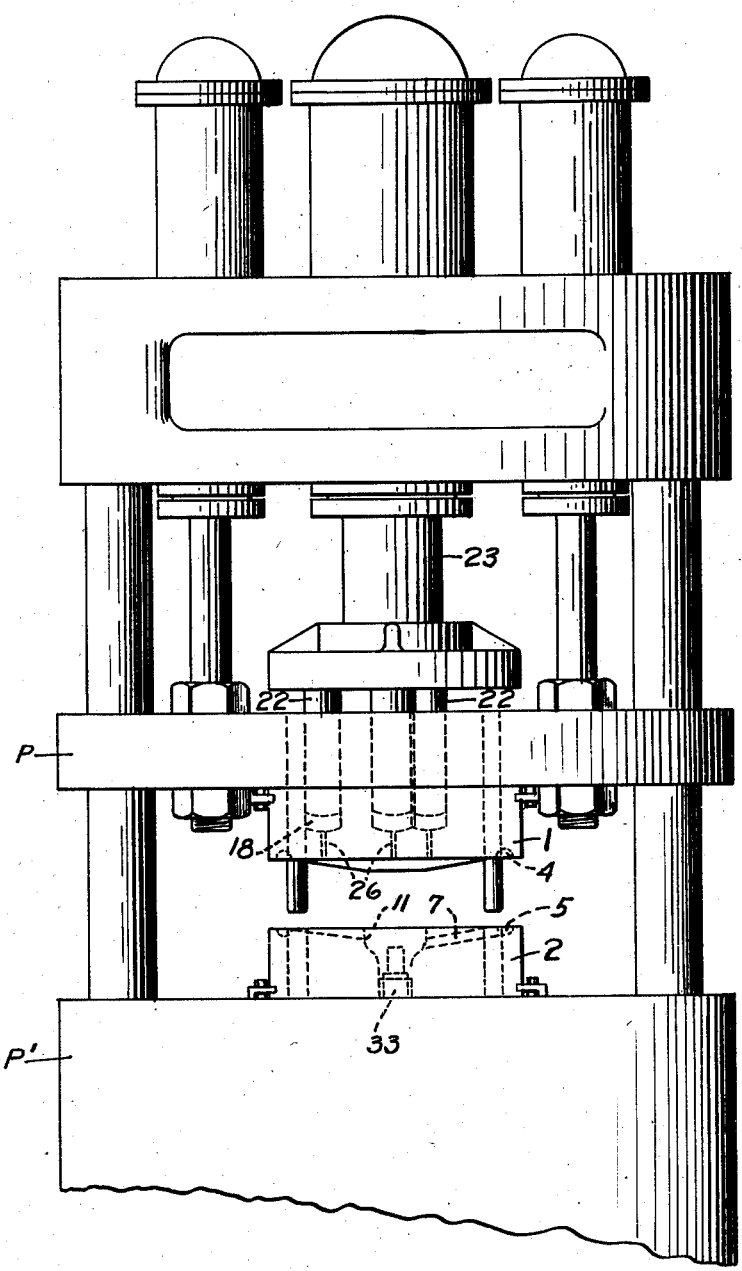
Fig. 1 is an elevation of a suitable press and my mold apparatus.
Figure 2:
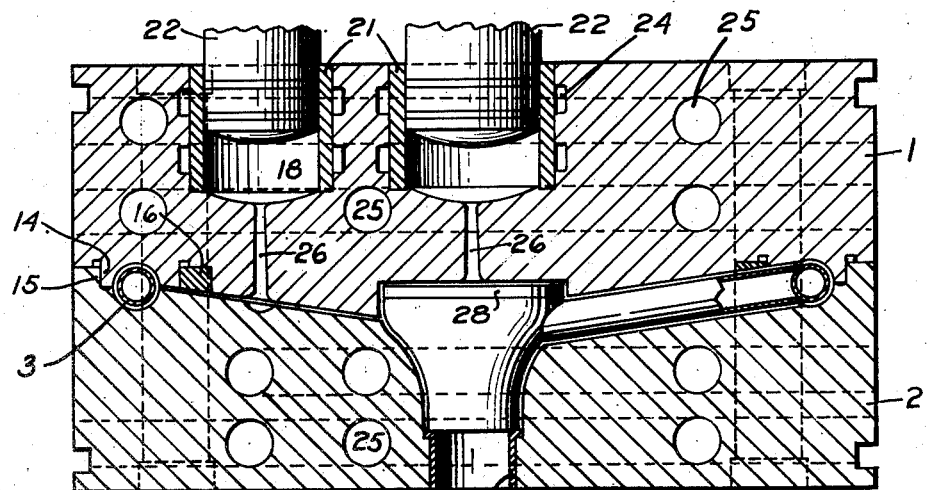
Fig. 2 is a sectional view through the mold.

Referring to Figs. 1 to 8 inclusive, the mold is shown comprising upper and lower mold blocks 1 and 2, respectively, which may be suitably mounted on the movable and stationary platens P and P1 of a hydraulic press.

While the present mold is particularly adapted to apply a coating of thermoplastic material to a steering wheel core, it should be understood that other articles made of wood or hollow metal may be covered in a similar manner.

Each of the mold blocks is provided with recesses formed in the abutting surfaces thereof which, when the blocks are in engagement with each other, register so as to form a unitary cavity as at 3 the volume of which is greater than that of the steering wheel core to be covered.

The cavity 3 comprises opposed rim recesses 4 and 5 in the upper and lower mold blocks respectively, which are connected through a plurality of radially directed spoke recesses 6 and 7 to central hub recesses 8 and 11. While the spoke and rim recesses are shown substantially semi-circular in shape, other shapes may be employed as desired.

The mold shown is a positive type mold particularly in that the surfaces adjacent the annular rim cavity extend substantially horizontally each way for a short distance, and outside of the cavity they extend upwardly along surfaces indicated at 14 and 15 which are closely fitted to prevent flow of material and to retain the necessary very high pressure on the material during the molding operation.

On one of the flat surfaces as at 12 may be provided an annular groove permitting a slight overflow of the plastic material to assure flowing at the meeting line of the material, permitting escape of gas and assuring a welding of the material, although in properly fitted molds this may be unnecessary.

Inwardly of the rim the material may be confined against inward flow by providing a cylindrical concentric ring as at 16 on the lower mold block 2, which may be integral with or mounted thereon in any convenient manner, as by screws or welding. This ring is adapted to enter and engage the walls of an annular recess 17 provided in the upper block 1.

Figure 3:
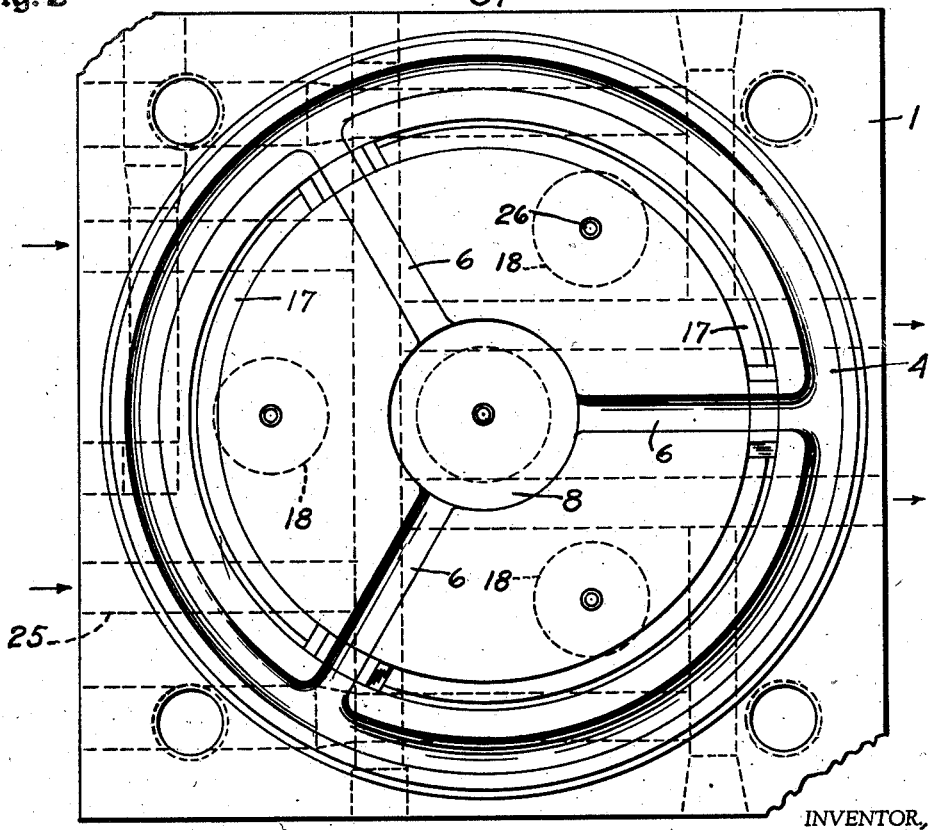
Fig. 3 is a plan view of the upper block of the mold.
Figure 4:
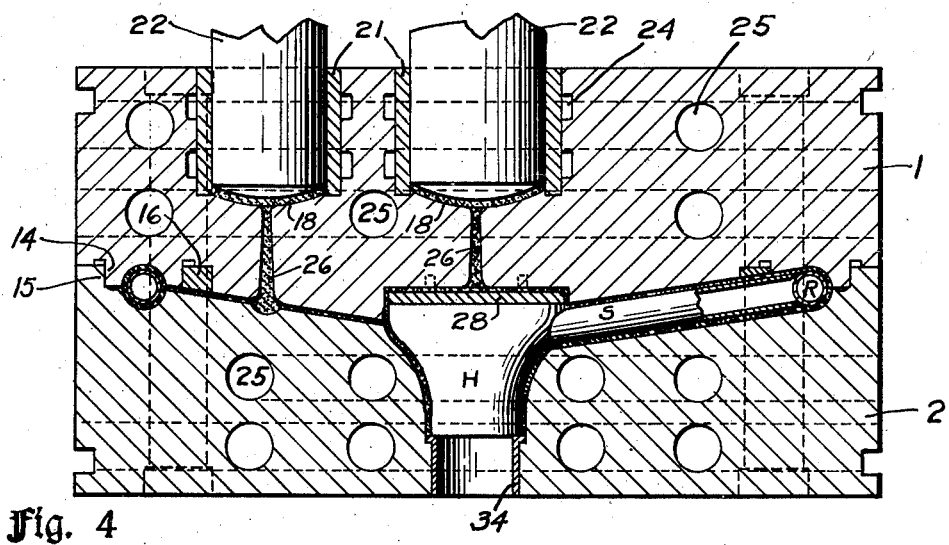
Fig. 4 is a sectional view through the mold showing the plastic material around the steering wheel core.

The charge cylinders 18 in the upper mold block are preferably arranged as shown in Fig. 3, so as to be located as near as possible to the mold cavity. Each of the cylinders is lined with a bushing as at 21, which is tightly pressed into place. In the cylinders are fitted suitable plungers 22 which may be simultaneously operated by a separate ram, shown at 23 in Fig. 1.

The bushings 21 may be surrounded by a plurality of annular grooves or recesses 24 which conduct heating fluid, such as steam. This heats the material within the cylinder to a plastic state. These grooves are connected to a steam line, not shown.

Each of the mold blocks contains a plurality of longitudinal and transverse fluid passages, indicated at 25, through which heating and cooling fluid, such as steam and cold water, may be conducted to control the temperature of the mold as desired. These passages 25 may be so connected as to alternately conduct the hot and cold thermal fluid.

Leading from the head end of each of the cylinders 18 is a passage indicated at 26 which conducts the material downwardly toward the lower surface of the mold block 1. These passages are preferably slightly conical in shape, the base or larger opening thereof being at the lower surface of the mold block to reduce the resistance to motion as the plastic becomes cooler and more viscous.

Figure 5:
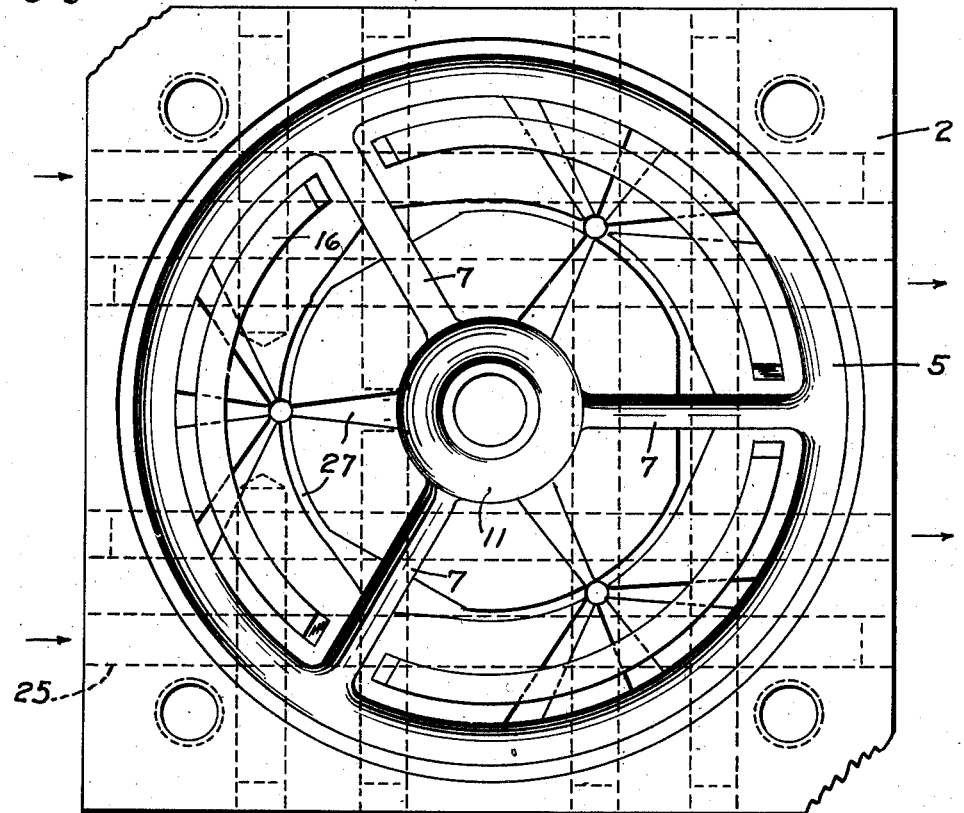
Fig. 5 is a plan view of the lower block of the mold.

Registering with the outlet opening of the passages 26 are a plurality of channel shaped gates as at 27, shown as formed in the surface of the lower mold block 2 which conduct the plastic material to the mold cavity 3 at separated points, as shown in Fig. 5. These gates are preferably symmetrically arranged with respect to the cavity as a whole to insure a pressure balanced condition over the entire surface of the article or insert to be covered.

It is essential that this balanced pressure condition be obtained in order that the surfaces of the core be at all times spaced a uniform distance from the walls of the cavity. If a pressure balance is not maintained, it is evident that the material entering the cavity may distort or deflect the core toward the surface of the mold cavity, thus producing a thin or bare spot in the thermoplastic coating.

In the illustration of an article to be coated, the applicant particularly has in mind a large hollow article in which the volumetric content of the frame or article to be coated, is relatively large compared to the volume of the thermoplastic coating. In the application of which the present application is a continuation in part, is illustrated a conventional form of steering wheel having a hollow hub and tubular spoke and rim construction. In the drawings of the aforesaid application and in the drawings of the present application, the thickness of the thermoplastic material relative to the diameter of the article being coated, is illustrated about as accurately as the drawings would permit. For example, it will be seen that if the steering wheel rim be ⅞ of an inch in diameter the thickness of the thermoplastic material may be from 1/16 of an inch to under 3/32 of an inch.

Briefly, the exterior of the hub H is substantially bell-shaped, the spokes S are suitably fitted thereto and so connected with the hub and with the rim R that they leave no openings through which the material can enter the wheel.

The hub however, is shown open at the top and as having a cup-shaped reinforcing member H1 terminating in the same plane with the outer shell or bell of the hub, thus to prevent the thermoplastic material entering the hub it is necessary to cover the top of the hub as by a strong disc member 28, Figs. 6 and 7.

Where the hub presents a relatively large area, the complete coating of it by the thermoplastic material may be assured by providing a central cylinder and piston construction having its gate 26 communicating with a central cavity formed in the top of the disc cap 28, and from which may radiate a plurality of gate members 32 communicating with a cavity portion 8 in the upper mold and the bell-shaped cavity 11 in the lower mold member. The disc is shown as provided with dowell pins 31 fitting recesses in the upper mold member, serving to hold it firmly in place.

Assuming that thermoplastic material in any suitable state such as crystals, powder, or prepared blanks have been placed in the cylinders 18, and heat has been applied by heated fluid in the passages 24 until the material has reached a fluid state, then while tightly holding the mold members together by pressure on the movable and stationary platens P and P1, the press is operated to move the pistons 22 inwardly and cause the material to flow through the gates described into the cavity under very high pressures. For example, the molds may be held together with pressures equivalent to several tons per square inch of vertical and projected area of mold cavity.

While the ejecting pressure on the pistons 22 may be one to two tons per square inch, this assures a complete filling of the cavity and regardless of how tightly the mold members are pressed together some leakage permits the escape of gases from the mold cavity and also may permit a very slight overflow of the material, leaving a fin such as indicated at F in Fig. 8, where the coated wheel is designated W.

These high pressures assure the proper density and welding of the material as it meets from the separated gates, and thus a complete welding in all directions of the surface of the material whereby it retains itself in closely embracing position permanently on the insert or metal frame of the article.

During the flow, the temperature of the mold is preferably such as to avoid chilling the material to a degree which precludes or prevents proper welding of its inherent particles, and also the proper welding at all meeting lines of the flow. Immediately after this flow and the filling of the cavity the mold may be chilled slightly to assure solidification of the thermoplastic material in the cavity, by causing cooling liquid to flow through the passages 25. In a very short time, that is, a matter of a few seconds, the mold may be opened and the article removed.

For convenience, particularly when making a large article such as a steering wheel, suitable ejector means may be provided.

As shown, such an ejector comprises a substantially cylindrical member 33 which projects through a suitable opening provided in the bottom of the lower mold block 2. This opening may be lined with a bushing as at 34 which acts as a guide for the ejector and to insure lasting wear between the moving surfaces. The lower end of the ejector is shown terminating in a threaded shank portion 35 having a nut 36 engaged therewith to provide vertical adjustment between the ejector and an ejecting plate 37 which may be manually or automatically operated. The upper portion of the ejector is provided with a narrow pin as at 38 which serves as a pilot to locate and hold the steering wheel core in the center of the mold cavity. The upper end of the cylindrical member 33 may terminate in a shoulder as at 41, for contacting the central portion 42 of the steering wheel hub during ejection of the finished wheel whereby to lift the wheel from the recesses in the lower mold, as shown in Fig. 8.

Figure 9:
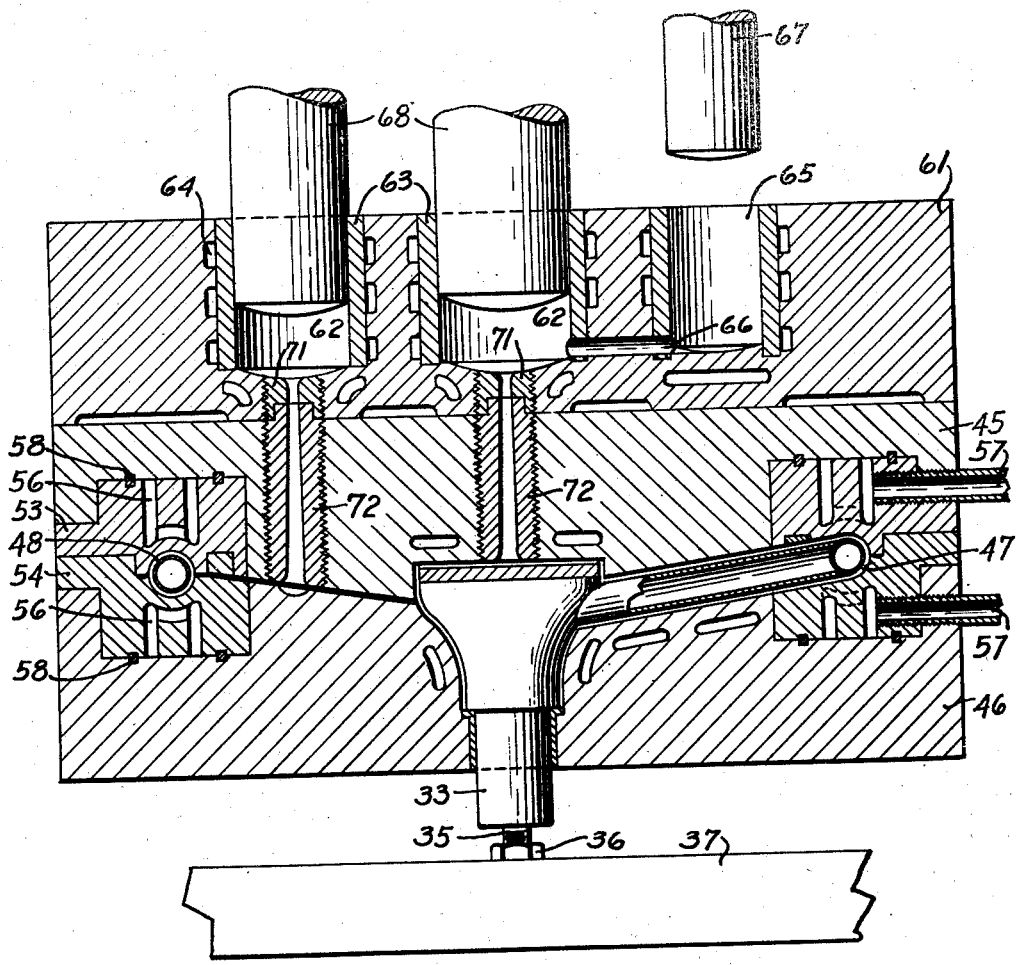
Fig. 9 is a sectional view showing a modification of the present mold.
Figure 10:
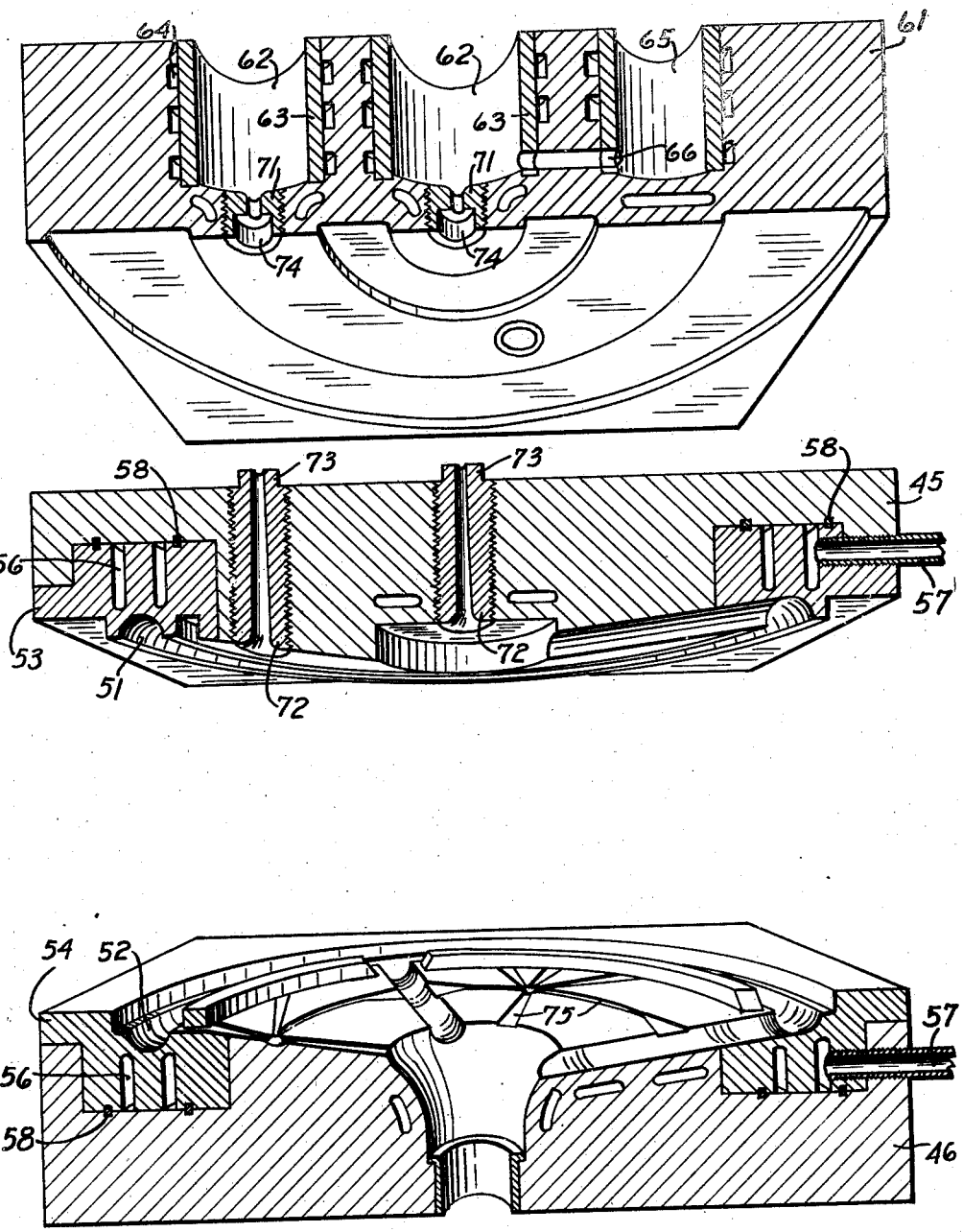
Fig. 10 is a perspective view of the mold shown in Fig. 9, the parts being separated to illustrate the construction.

Referring now to Figs. 9 and 10, a modification of the mold is shown in which the upper and lower mold blocks 45 and 46, respectively, when brought into engagement with each other, as illustrated in Fig. 9, form a unitary cavity 47 substantially identical in shape and size to the cavity 3 in the previously described mold.

The rim cavity 48 is defined by annular recesses 51 and 52 produced in the upper and lower blocks, respectively. Each of these recesses is formed in an annular ring as at 53 and 54, which is subsequently pressed into suitable cylindrical depressions in the upper and lower mold blocks, respectively. Coacting shoulders on the rings 53 and 54 which are located adjacent the inner and outer edges of the rim cavity serve to confine the material in the same manner as that described in the previous form.

These rings may be provided with annular grooves as at 56 in the faces opposite the recesses 51 and 52 which provide passages for thermal fluid which controls the temperature of the mold adjacent the rim cavity. These grooves are preferably interconnected with each other and with steam and cold water lines through pipes as at 57. The temperature of the mold cavity may thus be held constant or alternately heated and chilled as desired. The thermal fluid is definitely confined to the passages 56 by means of ring gaskets as at 58.

The ring inserts 53 and 54 may be made of hardened steel to preserve the true shape and the highly polished surface of the cavity walls which might be difficult to maintain in a single piece block. Another advantage in having such ring inserts is that greater efficiency in heat transfer is obtained from the thermal passages to the surface of the cavity by reason of the close proximity of the passages 56 with the cavity 47.

In this modification the charge cylinders are located in a separate block as at 61 which is superimposed on the mold block 45 so that the same block 61 may be used interchangeably with other mold blocks for producing different articles. Thus one charge cylinder block 61 may be used to serve any one of several mold blocks the total cost of which would be considerably less than the same number of such mold blocks each having integral charge cylinders.

Like the previous form the charge cylinders 62 may be lined with bushings as at 63 which are surrounded by thermal fluid passages 64 formed in the block 61.

Auxiliary cylinders as at 65, where the raw plastic material is introduced provide preheating chambers which bring the temperature of the material to the melting point, which in the case of cellulose acetate is over 250° F.

From the preheating chambers the molten material is urged through transverse passages as at 66, by means of plungers 67 which are operated independently of plungers 68, into the charge cylinders 62. In the cylinder 62 the material is preferably further heated to a temperature ranging from 300° to 400° F. prior to the injecting operation.

As plungers 68 move downwardly, the plastic substance is forced through nozzles 71 which may be threaded or otherwise secured in the block 61 at the head end of cylinders 62. The material continues through nozzles 72 which are similarly secured in the upper mold block 45 and are arranged to register with corresponding nozzles 71. To prevent the escape of any material at the junction between nozzles 71 and 72, the abutting ends thereof may be provided with a suitable joint, such as a cylindrical projection 73, on one fitting into a cylindrical recess 74 in the other.

Registering with the outlet of nozzles 72 are a plurality of gates 75 substantially identical with the gates 27 shown in Fig. 5.

To facilitate trimming the completed wheel it may be found desirable to increase the width of the gates as they approach the mold cavity. Such increase in width of the gate is preferably accompanied by a corresponding decrease in depth thereof so as to maintain a substantially constant area of cross section throughout the length of each gate. The material thus enters the cavity through a relatively thin, long orifice at the division line of the mold and which may be quickly trimmed off after the wheel has been ejected to leave a smooth, flawless surface.

From the foregoing description it will be seen that the present invention accomplishes all of the objects set forth and also decreases the mold cost, decreasing the time cycle of molding operation, insuring the production of consistently satisfactory thermoplastic articles, and the production of such articles at a lower price than has heretofore been possible.

Although applicant has shown and described but two modifications of the present invention, he does not wish to be strictly limited thereto, since it may be apparent to those skilled in the art that other modifications may be made without departing from the spirit and scope as defined in the hereunto annexed claims.

Having thus described my invention, what I claim is:

1. An injection type mold including separable mold members having a plurality of charge injection cylinders in said mold members, gates connecting said cylinders to a single cavity, the volume of said cavity being greater than the volume of any one of said charge injection cylinders, said injection cylinders and gates being arranged to effect a minimum distance of travel of the injected material to completely fill the volume of said cavity, and said gates being arranged to evenly distribute the material to the cavity and discharging thereto through narrow slot-like openings at and parallel with the parting line of the mold.

2. In combination, a divided mold for making thermo-plastic articles having registering annular cavities, a plurality of injecting means and passages connecting each of said injecting means with said cavity, said passages terminating at the parting line and being of long and narrow cross-sectional shape at the point of connection with the mold cavities, heating means for each of said injecting means for bringing the thermoplastic material to fluid state, the volume of said cavity being greater than the volume of any one of said injecting means, and means for holding the mold parts tightly together and means for preventing escape of material and loss of pressure during the pressure flow of the material.

3. A method of coating a hollow metal article in the form of an annulus, comprising forming the article into an annulus with its surface substantially the shape of and slightly smaller than the cavity of separable mold members, placing and holding the insert in the mold members in a position such that the plane of the division of the mold passes substantially through the midplane of the annulus, preheating to a fluid state, and then injecting cellulose acetate into the mold cavity at substantially uniformly separated points and at the line of division of the mold while holding the mold parts together with very high pressure until after solidification of the cellulose acetate.

4. An apparatus including a positive type mold for use in injecting a uniform coating of cellulose acetate onto a preformed article and of a thickness not to exceed three thirty-seconds of an inch, said mold comprising the engageable blocks adapted to be held together and confine the material against escape to thus maintain high pressure, walls in the mold block defining a cavity and shaped to receive the article to be coated, and means adapted to engage a surface on a preformed article which surface is not to be covered and whereby to uniformly space and hold the article from the cavity walls, heating means for liquefying cellulose acetate, passages leading therefrom to the mold cavity, and means for injecting the cellulose acetate in an enveloping sheet form progressively enclosing the article until homogeneously welded in all directions of its surface.

5. A mold for applying a coating of thermoplastic material to the surface of a preformed article comprising separable mold blocks having recesses formed to provide a unit cavity shaped to receive the article to be coated, means for engaging supporting means on the article whereby to centrally locate and hold the preformed article a uniform distance from the walls of said unit cavity, a plurality of injection chambers for urging the plastic material into said unit cavity, injection gates leading from said chambers and symmetrically arranged to produce a uniform pressure around the article during injection, the width of said gates at the entrance to the cavity being less than the uniform distance between the article and the walls of the cavity.

6. A method of molding cellulose acetate material into articles of predetermined shape, comprising heating the material and forcibly injecting it under high pressure into a closed mold of said shape while maintaining the temperature of the mold cavity surface below the plasticizing temperature of the material, but materially higher than that of a cold mold at room temperature, and confining the material against overflow while continuing the high pressure, thereby developing and maintaining a pressure on the material in the cavity substantially equal to the injecting pressure during and after the formation of the article until its solidification, lowering the temperature of the mold slightly to assure complete solidification, removing the article from the mold, and again raising the temperature of the mold slightly to repeat the cycle.

7. A method of molding cellulose acetate material into articles of predetermined shape, comprising heating the material to a temperature of 250° F. or above and forcibly injecting it into a mold of said shape while maintaining the temperature of the mold cavity surface at 200° F. or slightly below and confining the material against overflow while continuing the high pressure thus developing and maintaining a pressure on the material in the cavity substantially equal to the injecting pressure during and after the formation of the article until its solidification, lowering the temperature slightly to assure complete solidification, removing the article from the mold, and again raising the temperature of the mold slightly to repeat the cycle and whereby to shorten the molding cycle.

8. A mold for applying a coating of thermoplastic material to the surface of a preformed article comprising separable mold blocks having recesses formed to provide a unit cavity shaped to receive the article to be coated, means for engaging supporting means on the article whereby to locate and hold the preformed article to uniform distance from the walls of said unit cavity, interfitting surfaces on the mold members around the cavity at an angle to the meeting faces of the mold blocks, high pressure injection means for urging the plastic material into said unit cavity arranged to produce a uniform pressure around the article during injection, said interfitting surfaces serving to confine the material against overflow whereby to maintain pressure on the material in the cavity substantially equal to the pressure of the injecting means.

9. A method of molding a cellulose acetate coating of uniform thickness to the surface of a preformed article, comprising placing the article in a cavity having a shape complementary to the article and slightly greater in volume, the mold engaging the article at a surface not to be covered to support and hold the article at a uniform distance from the cavity walls whereby to leave an uninterrupted space around the entire surface to be coated, placing the cellulose acetate in a heating chamber communicating with the cavity, subjecting the acetate to high pressure causing it to flow quickly into the cavity while the mold members are held together with sufficient pressure to prevent separating under the hydrostatic pressure of the acetate and while confining the acetate to prevent overflow, maintaining the acetate in fluent state until it has completely filled the mold cavity, and maintaining said high pressure on the acetate in the cavity during and after formation of the coating and until complete homogeneous uniting and solidification of the acetate.

10. The process of molding a thin uniform coating onto a preformed article, comprising holding the article at a surface not to be coated to position the surfaces to be covered in a mold cavity substantially uniformly spaced from the cavity surfaces, heating thermoplastic material to a fluid state and causing the flow of the fluent material under high injection pressure into the mold cavity, maintaining the mold at a temperature level enabling the fluent material to reach all points of the cavity whereby to embrace the article and flow along and completely cover the surfaces to be coated and to form thereon an uninterrupted enveloping coating of the flowing material and confining the material against overflow while continuing the high pressure, thus developing and maintaining a pressure on the material in the cavity substantially equal to the injecting pressure during and after formation of the coating and until solidification of the momentarily fluent material into a continuous homogeneous enveloping structure.

HARRY A. HUSTED.